United States Patent
Richter

(10) Patent No.: US 11,863,914 B2
(45) Date of Patent: Jan. 2, 2024

(54) PROJECTION APPARATUS AND METHOD FOR GENERATING AN IMAGE BY MEANS OF A PROJECTION APPARATUS

(71) Applicant: OSRAM Opto Semiconductors GmbH, Regensburg (DE)

(72) Inventor: Daniel Richter, Bad Abbach (DE)

(73) Assignee: OSRAM OPTO SEMICONDUCTORS GMBH, Regensburg (DE)

(*) Notice: Subject to any disclaimer, the term of this patent is extended or adjusted under 35 U.S.C. 154(b) by 0 days.

(21) Appl. No.: 17/781,932

(22) PCT Filed: Nov. 30, 2020

(86) PCT No.: PCT/EP2020/083869
§ 371 (c)(1),
(2) Date: Jun. 2, 2022

(87) PCT Pub. No.: WO2021/110578
PCT Pub. Date: Jun. 10, 2021

(65) Prior Publication Data
US 2023/0008186 A1   Jan. 12, 2023

(30) Foreign Application Priority Data
Dec. 5, 2019 (DE) .................... 10 2019 218 920.2

(51) Int. Cl.
*H04N 9/31* (2006.01)
(52) U.S. Cl.
CPC ......... *H04N 9/3158* (2013.01); *H04N 9/3108* (2013.01)

(58) Field of Classification Search
CPC .... G03B 21/006; G03B 21/008; G03B 21/28; G03B 21/145; G03B 21/204;
(Continued)

(56) References Cited

U.S. PATENT DOCUMENTS

| 6,031,653 A | 2/2000 | Wang |
| 2003/0020809 A1* | 1/2003 | Gibbon ................ H04N 13/363 348/E13.058 |

(Continued)

FOREIGN PATENT DOCUMENTS

| DE | 101 39 496 A1 | 3/2002 |
| DE | 10 2008 011 866 A1 | 9/2009 |
| DE | 10 2010 001 945 A1 | 8/2011 |

OTHER PUBLICATIONS

International Search Report issued for corresponding International Patent Application No. PCT/EP2020/083869 dated Feb. 24, 2021, along with an English translation.

(Continued)

*Primary Examiner* — Sultan Chowdhury
(74) *Attorney, Agent, or Firm* — HAUPTMAN HAM, LLP

(57) ABSTRACT

A projection apparatus includes a light source for emitting light with an initial spectral distribution, an optical element, and a projection surface. The optical element is arranged in a beam path of light emitted from the light source between the light source and the projection surface. The optical element includes a number of pixels. The pixels of the optical element are each configured to convert light with the initial spectral distribution into light with a predetermined final spectral distribution different from the initial spectral distribution.

11 Claims, 4 Drawing Sheets

Figure 1:
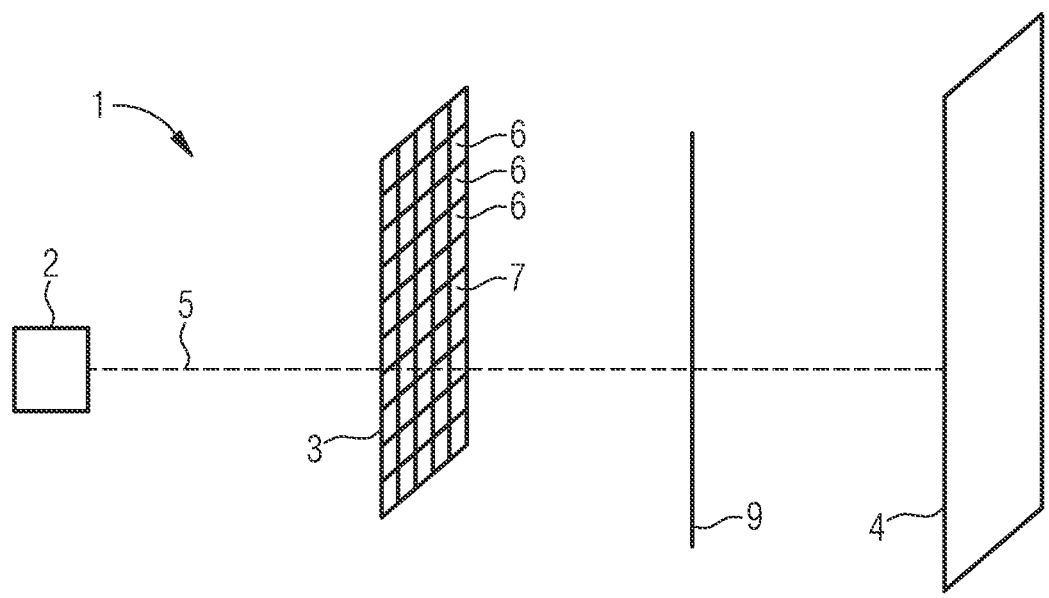

(58) Field of Classification Search
CPC .............. G03B 21/208; G03B 21/2013; G03B 21/2033; G03B 21/2053; G03B 21/2066; H04N 9/315; H04N 9/3105; H04N 9/3108; H04N 9/3141; H04N 9/3161; H04N 9/3164; G02B 26/001; G02B 26/02; G02B 26/008; G02B 26/0816; G02B 26/0833
See application file for complete search history.

(56) References Cited

U.S. PATENT DOCUMENTS

| | | | |
|---|---|---|---|
| 2006/0018348 A1 | 1/2006 | Przybyla et al. | |
| 2007/0064295 A1 | 3/2007 | Faase et al. | |
| 2007/0206164 A1* | 9/2007 | Beeson | G03B 21/2073 353/94 |
| 2007/0236757 A1 | 10/2007 | Stewart et al. | |
| 2008/0239455 A1 | 10/2008 | Kogut et al. | |
| 2009/0180061 A1* | 7/2009 | Hu | G03B 21/006 349/106 |
| 2011/0310478 A1* | 12/2011 | Silverstein | G03B 33/16 977/774 |
| 2013/0271673 A1* | 10/2013 | Katou | H04N 9/12 348/744 |
| 2014/0022290 A1 | 1/2014 | Saigo | |
| 2015/0138620 A1 | 5/2015 | Cho et al. | |
| 2017/0131475 A1* | 5/2017 | Wehner | G02F 1/157 |
| 2019/0110029 A1* | 4/2019 | Wang | H04N 9/3114 |

OTHER PUBLICATIONS

Written Opinion issued for corresponding International Patent Application No. PCT/EP2020/083869 dated Feb. 24, 2021.

Mirshafieyan et al., "Electrically tunable perfect light absorbers as color filters and modulators", Scientific Reports 8:2635 (2018), pp. 1-9, cited in the Specification.

Liu et al., "Tunable reflective color filters based on asymmetric Fabry-Perot cavities eploying ultrathin Ge2Sb2Te5 as a broadband absorber", Applied Optics, vol. 57, No. 30, Oct. 20, 2018, pp. 9040-9045, cited in NPL Nos. 1 and 2.

Aalizadeh M. et al., "Toward Electrically Tunable, Lithography-Free, Ulta-Thin Color Filters Convering the Whole Visible Spectrum", Scientific Reports, 8:11316 (2018), pp. 1-11, cited in the Specification.

"DLP—Digital Light Processing", Kompendium Technical Know-How By Infotip Service Gmbh, <https://kompendium.infotip.de/dlp.html>, along with an English machine translation.

* cited by examiner

PROJECTION APPARATUS AND METHOD FOR GENERATING AN IMAGE BY MEANS OF A PROJECTION APPARATUS

CROSS REFERENCE TO RELATED APPLICATION

This application is a National Stage of International Application No. PCT/EP2020/083869, filed on Nov. 30, 2020, which designates the United States and was published in Europe, and which claims priority to German Patent Application No. 10 2019 218 920.2, filed on Dec. 5, 2019, in the German Patent Office. Both of the aforementioned applications are hereby incorporated by reference in their entireties.

A projection apparatus is disclosed. Furthermore, a method for generating an image on a projection surface by means of a projection apparatus is disclosed.

An object to be solved consists, among other things, in specifying a projection apparatus that is characterized by lower costs, a longer service life and fast switching times. A further object to be solved is, among other things, to specify a method for generating an image wherein such a projection apparatus is used.

These objects are solved by an apparatus with the features of independent patent claim 1 and by a method with the features of independent patent claim 11, respectively. Advantageous embodiments and further developments are the subject of the respective dependent patent claims.

According to at least one embodiment of the projection apparatus, the projection apparatus comprises a light source for emitting light with an initial spectral distribution, an optical element, and a projection surface. In particular, the light source comprises one or more radiation emitting semiconductor chips, such as light emitting diode chips. Preferably, the light source includes a mirror or a plurality of mirrors and/or a lens or a plurality of lenses that collect and direct light emitted from the point light source.

For example, the initial spectral distribution comprises at least one wavelength range of the visible spectrum. For example, the initial spectral distribution has several local maxima, in particular three local maxima, one of which is located in the red wavelength range, one of which is located in the green wavelength range, and one of which is located in the blue wavelength range. The initial spectral distribution includes substantially all wavelengths of the visible spectrum, for example.

The optical element is, for example, an imaging element. In particular, the optical element generates an image that is displayed on the projection surface during intended operation of the projection apparatus. For example, the projection surface is a screen or a display.

According to at least one embodiment of the projection apparatus or its embodiments described above, the optical element is arranged in a beam path of the light emitted by the light source between the light source and the projection surface. In particular, during the intended operation of the projection apparatus, light emitted in a directional manner from the light source, for example, passes through the optical element and then hits the projection surface. In this case, the beam path is the path that the light takes between the light source and the projection surface. In particular, the beam path runs essentially along an optical axis of the projection apparatus, corresponding in particular to the latter.

According to at least one embodiment of the projection apparatus or one of its embodiments described above, the optical element comprises a number of pixels. In particular, the pixels are independently controllable and operable. For example, the optical element comprises more than 1000 or more than 10000 or more than 100000 pixels. Preferably, the optical element comprises more than 1 million pixels. In the intended operation of the projection apparatus, preferably the number of pixels of the optical element determines the number of pixels of the image displayed on the projection surface. For example, the pixels are arranged at regular intervals from each other. In particular, the pixels are arranged at the nodes of a regular grid. The regular grid is, for example, a rectangular grid, preferably a square grid.

According to at least one embodiment of the projection apparatus or one of its embodiments described above, the pixels of the optical element are arranged on a carrier. For example, the pixels are arranged adjacent to each other on a side of the carrier facing the light source. For example, the optical element has an intermediate space between each two adjacent pixels.

According to at least one embodiment of the projection apparatus or one of its embodiments described above, light absorbing elements are arranged on the carrier. In particular, the light absorbing elements cover the intermediate spaces between the pixels when viewed from the light source or from the projection surface. For example, the light absorbing elements are arranged on a side of the carrier facing away from the light source.

For example, the absorbing elements each comprise a matrix material, such as an epoxy or a silicone, wherein carbon black particles are embedded. Advantageously, the absorbing elements counteract optical crosstalk between the pixels.

According to at least one embodiment of the projection apparatus or one of its embodiments described above, a part of the intermediate spaces or all of the intermediate spaces are completely or partially filled with insulator material. Advantageously, this can reduce the risk of electrical interference or interaction between the pixels when driving the pixels.

According to at least one embodiment of the projection apparatus or one of its embodiments described above, the pixels of the optical element are each configured to convert light from the light source into light with a predetermined final spectral distribution that differs from the initial spectral distribution. The final spectral distribution comprises at most the wavelengths that are also included in the initial spectral distribution. In other words, the pixels have no wavelength-converting properties. For example, the final distribution differs from the initial distribution in terms of the wavelength ranges that it includes. Alternatively or additionally, the final distribution differs from the initial distribution with respect to the intensity at different wavelengths in the distributions. For example, the final distribution has substantially only one peak at a peak wavelength and a half-width (also called FWHM for "full width at half maximum"). The half-width is, for example, at most 100 nm or at most 50 nm, in particular at most 30 nm. The peak wavelength is the wavelength at which the spectral final distribution has an intensity maximum.

For example, the pixels each allow substantially one peak with a half-width from the initial spectral distribution to pass through. Alternatively, the pixels each filter out substantially one peak with a half-width from the initial spectral distribution.

In at least one embodiment of the projection apparatus or one of its embodiments described above, the projection apparatus comprises a light source for emitting light with an initial spectral distribution, an optical element, and a projection surface. The optical element is arranged between the light source and the projection surface in a beam path of light emitted from the light source. The optical element comprises a number of pixels, wherein the pixels of the optical element are each configured to convert light with the initial spectral distribution into light with a predetermined final spectral distribution different from the initial spectral distribution.

A projection apparatus described herein is based on the following technical features, among others. In order to display an image on a projection surface, an optical element is used as an imaging element between a projection surface and a light source. The optical element comprises a plurality of pixels, each of which affects light emitted by the light source. The image to be displayed is determined by the optical element before it is imaged on a projection surface.

For example, in conventional projection apparatuses a DMD chip is used as optical element for imaging. In a DMD chip, each pixel comprises a mechanically tiltable mirror that directs light from the light source either onto the projection surface or onto an absorption surface, depending on the image to be displayed. The tilting of the mirror of a series pixel determines whether the projection surface is illuminated with the light of the light source. When the image is generated by a DMD chip, the image is usually composed of a red sub-image, a green sub-image and a blue sub-image. The individual sub-images are displayed on the projection surface at short, successive intervals such that, due to the inertia of the human eye, an image with the desired color impression is created for a human observer.

The projection apparatus described herein makes use, among other things, of the idea of replacing the DMD chip with an optical element, wherein the pixels not only deflect the light from the light source, but each specifically converts its initial spectral distribution into a final spectral distribution. Advantageously, such an optical element comprises no mechanically movable parts, which leads to increased reliability. Furthermore, the system complexity of the projection apparatus can be reduced. Further advantageously, an optical element described herein has lower switching times, allowing higher frame rates to be realized on the projection surface.

According to at least one embodiment of the projection apparatus, the pixels of the optical element each comprise a transmission element. The transmission element comprises two electrical contacts for applying an electrical voltage. The transmission element comprises an electrically insulating material between two metallic layers. Each electrical contact is electrically conductively connected to one of the metallic layers, respectively.

The electrically insulating material has a refractive index that changes according to a function of the applied electrical voltage. The pixels of the optical element are configured to transmit light, for example. This means that a propagation direction of the incident light, specified by a wave vector for example, is not changed by the pixels of the optical element.

The electrical contacts of the transmission element are, for example, a cathode and an anode. The electrical contacts preferably have opposite polarity. For example, an electrical contact, for example the cathode, is formed for all pixels by a common contact structure. In particular, the contact structure itself is the carrier on which the pixels are arranged. Alternatively, the contact structure is integrated in the carrier, for example.

The metallic layers comprise, for example, gold, silver, or aluminum, or are formed from one of these materials or a mixture of these materials. The electrically insulating material comprises, for example, silicon oxide, silicon nitride, or aluminum oxide, or 4-dimethylamino-N-methyl-4-stilbazolium tosylate (DAST), or is formed from one of these materials.

For example, the metallic layers each have a thickness between 10 nm and 30 nm inclusive, measured perpendicular to their main extension plane. For example, the electrically insulating material has a thickness, measured perpendicular to its main extension plane, of between 60 nm and 90 nm, inclusive.

In particular, each transmission element forms a resonator, preferably a Fabry-Perot resonator, with a resonance condition. The resonator absorbs a wavelength that satisfies the resonance condition. The resonance condition depends on the thickness and refractive index of the electrically insulating material. For example, the metallic layers have such low thicknesses that they transmit light. Light incident on the transmission element can then enter and leave the resonator. In particular, light of the wavelength that satisfies the resonance condition is transmitted by the optical element. The transmitted light has the final spectral distribution. For example, the wavelength at which the final spectral distribution has its global maximum coincides with the wavelength that satisfies the resonance condition. In addition, it is possible that the final spectral distribution is influenced by localized or mobile surface plasmons and/or by absorption in the metallic layers.

An electrical voltage is applied to the metallic layers via the electrical contacts. The electrically insulating material has a refractive index that changes as a function of the applied electrical voltage. For example, an electrical voltage between −20 V inclusive and +20 V inclusive is applied. Thus, the resonance condition changes due to the refractive index of the insulating material varying in accordance with the applied electrical voltage. For example, the refractive index can be varied via the applied electrical voltage such that the wavelength range of the light transmitted by the respective transmission element can be selected as desired.

According to at least one embodiment of the projection apparatus, the pixels of the optical element each comprise at least one reflective element. The reflective element comprises two electrical contacts for applying an electrical voltage. The reflective element comprises an electrically insulating material and a semiconductor material between two metallic layers. One metallic layer each is electrically conductively connected to an electrical contact of each pixel. The semiconductor material has a charge carrier density that changes according to a function of the applied electrical voltage.

In particular, the reflective element is configured to reflect light. This means that a propagation direction of the incident light and a propagation direction of the outgoing light are different. An angle of incidence measured between a wave vector of the incident light and the surface normal of the reflective element is thereby equal to an angle of reflection measured between a wave vector of the outgoing light and the surface normal of the reflective element.

The electrical contacts of the reflective element are, for example, a cathode and an anode.

The semiconductor material of the reflective element comprises, for example, a III/V compound semiconductor material, in particular InSb, and is preferably doped. In particular, the semiconductor material of the reflective element is n-doped. The electrically insulating material is preferably titanium dioxide.

For example, the metallic layers each have a thickness between 35 nm and 100 nm, inclusive.

The electrically insulating material preferably has a thickness, measured perpendicular to its main extension plane, of about 40 nm. The semiconductor material further preferably has a thickness, measured perpendicular to its main extension plane, between 10 nm and 20 nm inclusive.

In particular, each reflective element between the metallic layers forms a resonator, preferably a Fabry-Perot resonator, with a resonance condition. For example, a refractive index of the semiconductor material changes with the charge carrier density of the semiconductor material, which changes a resonance condition of the associated reflective element. For example, an electric voltage between 0 V and −50 V is applied to each reflective element. In particular, by varying the electric voltage, the carrier density changes in a range between $10^{18}$ cm$^{-3}$ and $10^{21}$ cm$^{-3}$.

In this embodiment, substantially all wavelengths of the initial spectral distribution are present in the final spectral distribution except for the wavelength that satisfies the resonance condition and is absorbed in the reflective element. The reflective element reflects incident light having the initial spectral distribution, the reflected light having a final spectral distribution that includes all wavelengths of the initial spectral distribution except for the wavelength that is absorbed in the reflective element.

According to at least one embodiment or one of its embodiments of the projection apparatus described above, the optical element comprises a first subelement, a second subelement, and a third subelement. Each of the subelements comprises a number of subpixels. One subpixel of each of the first, second, and third subelements together form one pixel of the optical element. Each subpixel comprises a reflective element.

In particular, the subpixels of each subelement are independently controllable and operable.

According to at least one embodiment of the projection apparatus or one of its embodiments described above, the number of subpixels of each subelement corresponds to the number of pixels of the optical element.

According to at least one embodiment of the projection apparatus or one of its embodiments described above, the initial spectral distribution comprises wavelengths of a green, blue and/or red wavelength range. The optical element comprises a separator configured to split light of the initial spectral distribution into light of the blue wavelength range, the green wavelength range, and the red wavelength range, and to direct light of the blue wavelength range onto the first subelement, to direct light of the green wavelength range onto the second subelement, and to direct light of the red wavelength range onto the third subelement. For example, the subpixels of the first subelement are configured to absorb light of the red wavelength range when an electrical voltage is applied. For example, the subpixels of the second subelement are arranged to absorb light of the green wavelength range when an electrical voltage is applied. Correspondingly, for example, the subpixels of the third subelement are arranged to absorb light of the blue wavelength range when a voltage is applied. Advantageously, a red sub-image can be displayed by the first subelement, a green sub-image can be displayed by the second subelement, and a blue sub-image can be displayed by the third subelement. It is further advantageous that these three sub-images can be generated in parallel.

According to at least one embodiment of the projection apparatus or one of its embodiments described above, an imaging device is arranged between the optical element and the projection surface. The imaging device assigns an area of the projection surface to each pixel of the optical element. In particular, the mapping is unambiguous, preferably one-to-one. Preferably, the areas of the projection surface do not overlap with each other. Further preferably, the areas of the projection surface form pixels of the image that is displayed on the projection surface during intended operation of the projection apparatus. Advantageously, an imaging device allows the image formed by the optical element to be displayed on the projection surface particularly well.

According to at least one embodiment of the projection apparatus or one of its embodiments described above, the light source comprises at least three light emitting semiconductor chips, wherein at least one of the light emitting semiconductor chips emits light of a red wavelength region, at least one of the semiconductor chips emits light of a green wavelength region, and at least one of the light emitting semiconductor chips emits light of a blue wavelength region.

For example, each of the semiconductor light emitting chips comprises a semiconductor layer sequence having an active region. The semiconductor layer sequence preferably comprises a p-conductive region and an n-conductive region. The active region is preferably arranged between the p-conductive region and the n-conductive region. The active region is configured to generate electromagnetic radiation, in particular to generate light. In particular, the active region includes at least one quantum well structure in the form of a single quantum well, SQW for short, or in the form of a multi-quantum well structure, MQW for short. Additionally, the active region includes one, preferably more, secondary well structures. For example, electromagnetic radiation in the red or green or blue wavelength range is generated in the active region during intended operation.

For example, the semiconductor layer sequence is based on a nitride compound semiconductor material, such as $Al_n In_{1-n-m} Ga_m N$, or on a phosphide compound semiconductor material, such as $Al_n In_{1-n-m} Ga_m P$, or on an arsenide compound semiconductor material, such as $Al_n In_{1-n-m} Ga_m As$, where $0 \leq n \leq 1$, $0 \leq m \leq 1$, and $m+n \leq 1$, respectively. Here, the semiconductor layer sequence may comprise dopants as well as additional components. For the sake of simplicity, however, only the essential components of the crystal lattice of the semiconductor layer sequence, i.e. Al, As, Ga, In, N or P, are specified, even if these may be partially replaced and/or supplemented by smaller amounts of additional substances.

In particular, mixed light is emitted by such a light source. For example, each of the light emitting semiconductor chips emits a spectral distribution in the form of a peak with a full width at half maximum. For example, the full width at half maximum is at most 30 nm, in particular about 27 nm. Depending on the composition of the mixed light, a human observer perceives a color impression. For example, a human observer perceives the mixed light as white light.

According to at least one embodiment of the projection apparatus or one of its embodiments described above, the light source comprises a light integrator. For example, the light integrator comprises one or more lenses. During intended operation, the light integrator preferably combines light of the red wavelength range, the green wavelength range, and the blue wavelength range to form mixed light.

According to at least one embodiment of the projection apparatus or one of its embodiments described above, the light source is a white light source configured to emit light with a continuous initial spectral distribution in the visible wavelength range. Here and in the following the term "continuous initial spectral distribution" means that light of a continuous initial spectral distribution comprises substantially all wavelengths of a given wavelength range. Thus, a continuous initial spectral distribution in the visible wavelength range comprises, in particular, substantially all wavelengths of the visible wavelength range.

According to at least one embodiment of the projection apparatus or one of its embodiments described above, the light source comprises at least one light emitting semiconductor chip comprising a conversion element. The conversion element is configured to convert light generated by the light emitting semiconductor chip into light of a continuous spectral output distribution in the visible wavelength range. For example, the light emitting semiconductor chip emits light in the blue wavelength region. For example, the conversion element is preferably a matrix material, such as silicone, wherein conversion particles are arranged. The conversion particles convert light of the blue wavelength range into light of longer wavelength ranges. Advantageously, a white light source can be realized particularly easily and cost-effectively with such a light source.

According to at least one embodiment of the projection apparatus, or one of its embodiments described above, a color wheel is arranged in the beam path between the light source and the optical element. For example, the color wheel comprises three segments, one segment having a red absorption filter, one segment having a green absorption filter, and one segment having a blue absorption filter. The red absorption filter is configured to absorb light outside the red wavelength range and transmit light of the red wavelength range. The green absorption filter is configured to absorb light outside the green wavelength range and transmit light of the green wavelength range. The blue absorption filter is arranged to absorb light outside the blue wavelength region and transmit light of the blue wavelength region. For example, the color wheel is arranged such that, during intended operation of the projection apparatus, only one segment is in the path of the light at any given time. In the intended operation, the color wheel rotates so that light of the red wavelength range, light of the green wavelength range and light of the blue wavelength range are alternately transmitted through the color wheel. Advantageously, the color wheel can be used to split light from a white light source alternately into light of a red wavelength range, a green wavelength range and a blue wavelength range during intended operation.

Further, a method for generating an image on a projection surface is disclosed. In particular, the projection apparatus described herein and embodiments thereof may be used to generate the image. That is, all features disclosed for the projection apparatus are also disclosed for the method, and vice versa.

According to at least one embodiment of the method, light with an initial spectral distribution is emitted from a light source. Subsequently, the light with the initial spectral distribution is incident on an optical element. In particular, the optical element comprises a number of pixels that can be driven and operated independently of each other. Light from the light source is partially absorbed by at least one of the pixels of the optical element, such that the initial spectral distribution is converted into a final spectral distribution that is different from the initial spectral distribution. Subsequently, the light that has passed through the optical element is incident on a projection surface.

For example, the optical element is an imaging element. This means that the image to be generated on the projection surface is formed by the optical element. That is, all image information is stored in the optical element, for example, and the image formed by the optical element is merely magnified on the projection surface, for example. Alternatively or additionally, the optical element is connected to a computer wherein image information of the image to be displayed is stored. In particular, the pixels of the optical element are then controlled and operated by means of the computer.

For example, light from the light source is converted into light of a final spectral distribution in each pixel such that the intensity, brightness, and/or chromaticity of each pixel of the optical element, and thus of each pixel of the image displayed on the projection apparatus, corresponds to the stored image information.

According to at least one embodiment of the method or its embodiment described above, each pixel of the optical element comprises a transmission element having two electrical contacts. An electrical voltage is applied to each transmission element by means of the electrical contacts and the initial spectral distribution of the light incident on the transmission element is converted into the final spectral distribution depending on the applied electrical voltage.

For example, the transmission element forms a resonator, in particular a Fabry-Perot resonator, wherein a resonance condition can be changed by applying an electrical voltage.

For example, light from a white light source with a continuous initial spectral distribution is incident on a transmission element. By applying a suitable electrical voltage to the transmission element, the latter generates a final spectral distribution from the continuous initial distribution, which essentially has a peak with a half-width. The color impression of the corresponding pixel of the optical element is adjusted by applying the electrical voltage to the transmission element.

Alternatively, for example, light from a light source is incident on a transmission element that essentially has a wavelength in the red wavelength range, a wavelength in the green wavelength range, and/or a wavelength in the blue wavelength range. In particular, such an initial distribution can be realized by means of three radiation emitting semiconductor chips or with a color wheel. In this case, the image on the projection surface is generated from three sub-images in particular. In particular, the sub-images are, for example, a green sub-image, a red sub-image and a blue sub-image. For example, the sub-images are displayed on the projection surface one after the other in a short temporal sequence. In particular, the temporal sequence is chosen to be so short that, due to the inertia of the human eye, the three sub-images are no longer distinguishable for a human observer, but the observer receives a colored impression of the overall image resulting from the three sub-images.

For example, in order to generate the green sub-image on the projection surface, an electrical voltage is applied to the pixels of the optical element so that the light of the green wavelength range is transmitted. In particular, the initial distribution in generating the green image comprises only wavelengths in the green wavelength range. For example, only a green radiation emitting semiconductor chip is active in the light source for this purpose.

Alternatively, it is also possible that all three radiation emitting semiconductor chips are activated and the initial distribution comprises wavelengths of the green, the red, the blue wavelength range. An electrical voltage is then applied to pixels of the optical element that are not to be imaged onto the projection surface when generating the green sub-image, in particular, such that only wavelengths that are not included in the initial spectral distribution fulfill the resonance condition of the transmission elements. For example, only wavelengths outside the visible wavelength range, such as wavelengths in the IR range, fulfill the resonance condition of the transmission elements.

For example, after generating the green sub-image, the red sub-image and the blue sub-image are generated according to the same principle as the green sub-image.

According to at least one embodiment of the method or embodiments thereof described above, at least one pixel of the optical element comprises, alternatively or in addition to a transmission element, at least one reflective element with two electrical contacts. In particular, each pixel comprises at least one reflective element alternatively or in addition to a transmission element. An electrical voltage is applied to the pixel via the electrical contacts, and the initial spectral distribution of the light incident on the pixel is converted into the final spectral distribution as a function of the applied electrical voltage. For example, the reflective element and/or the transmission element form a resonator wherein a resonance condition can be changed by applying the electric voltage.

For example, the initial spectral distribution essentially comprises a peak. For example, if no electrical voltage is applied to the reflective element, the light with the initial spectral distribution is completely or almost completely reflected at the reflective element. In this case, the final spectral distribution matches the initial spectral distribution. Alternatively, if a suitable electrical voltage, for example of −50 V, is applied to the reflective element at which the peak wavelength satisfies the resonance condition of the reflective element, the peak wavelength is absorbed. In this case, no light or almost no light is reflected from the reflective element. In particular, the intensity of the reflected light is so low that substantially no light is perceived by a human observer. An optical element with a number of reflective elements can thus be used to produce a monochromatic image on the projection surface.

According to at least one embodiment of the method or its embodiments described above, each pixel comprises a first, a second and a third subelement, each having a number of subpixels. In particular, the subpixels are each formed as a reflective element. Via a separator, for example, light from the light source is split and directed onto the subelements. In particular, light in the red wavelength range is directed to the first subelement, light in the green wavelength range is directed to the second subelement, and light in the blue wavelength range is directed to the third subelement. For example, by applying a voltage to the first subelement, light in the red wavelength region is absorbed. In particular, a red sub-image is formed by the first subelement. Accordingly, a green sub-image is formed by the second subelement, and a blue sub-image is formed by the third subelement. Light reflected from the subelements is preferably collected by a collecting element and combined to form a final spectral distribution. In particular, light from the collecting element is subsequently directed onto the projection surface. Advantageously, the collecting element produces a pixelated image with a desired color impression.

According to at least one embodiment of the method or its embodiments described above, light with the final spectral distribution is directed onto the projection surface via an imaging device between the optical element and the projection surface. By means of the imaging device, an area of the projection surface is preferably assigned, in particular uniquely assigned, to each pixel of the optical element.

Further advantages and advantageous embodiments and further developments of the projection apparatus and the method follow from the following exemplary embodiments described in connection with schematic drawings.

Elements that are identical, of the same type and have the same effect are given the same reference signs in the figures. The figures and the proportions of the elements shown in the figures are not to be regarded as true to scale. Rather, individual elements may be shown exaggeratedly large for better representability and/or for better comprehensibility.

Figure 2:
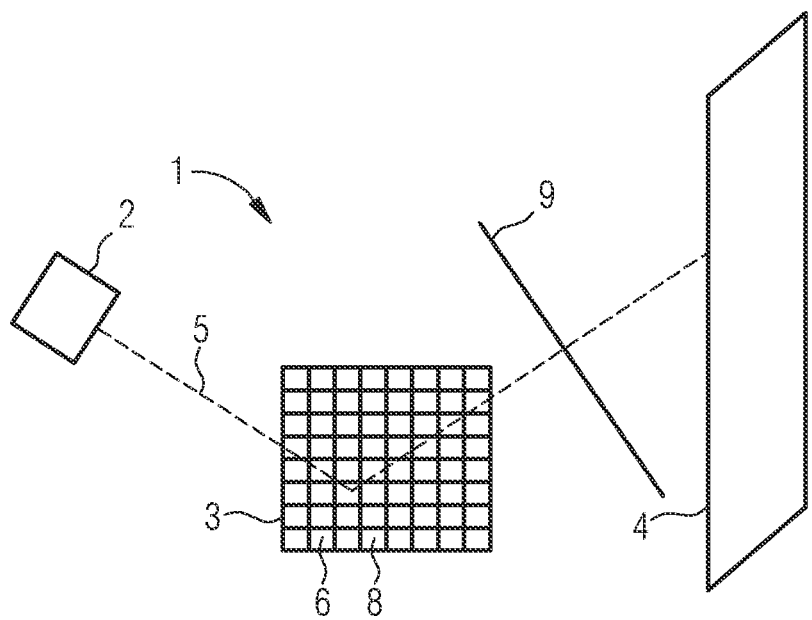
Figure 3A:
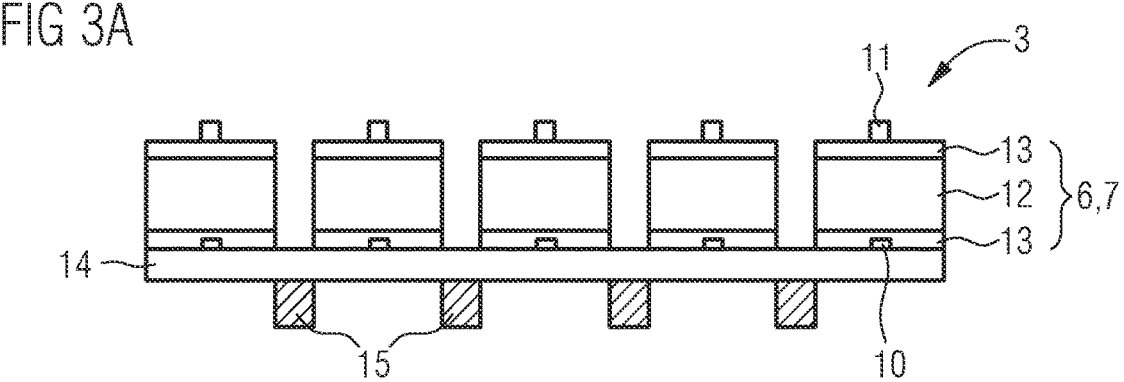
Figure 3B:
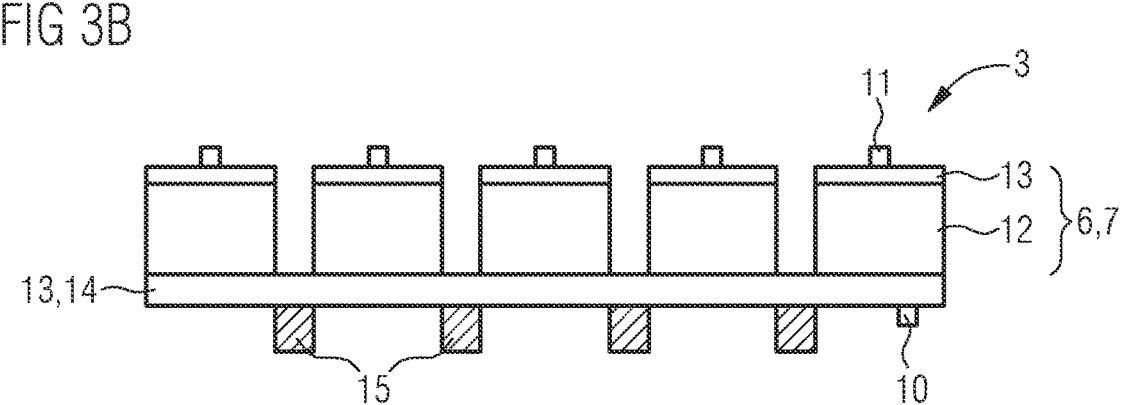
Figure 4:
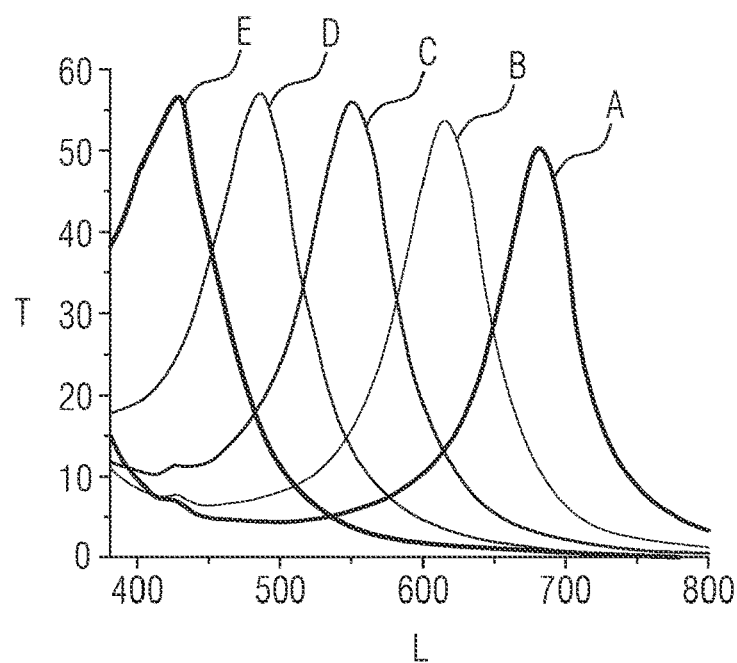
Figure 5:
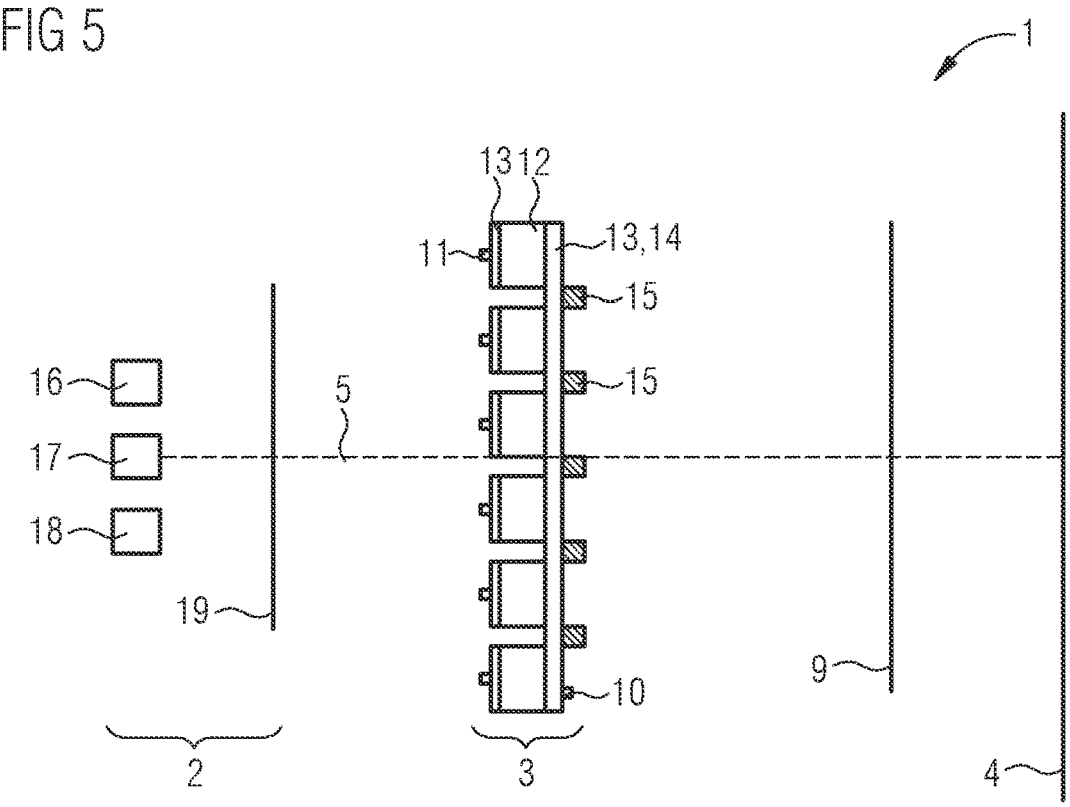
Figure 6:
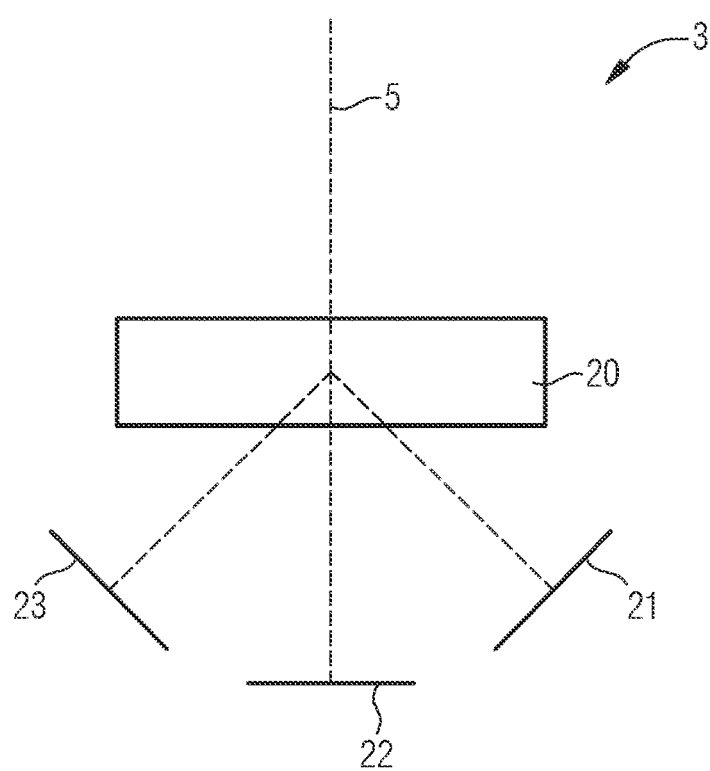
Figure 7:
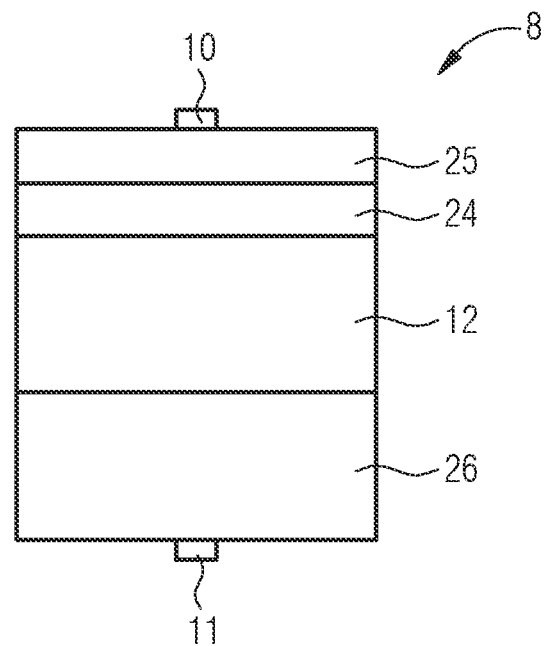
Figure 8:
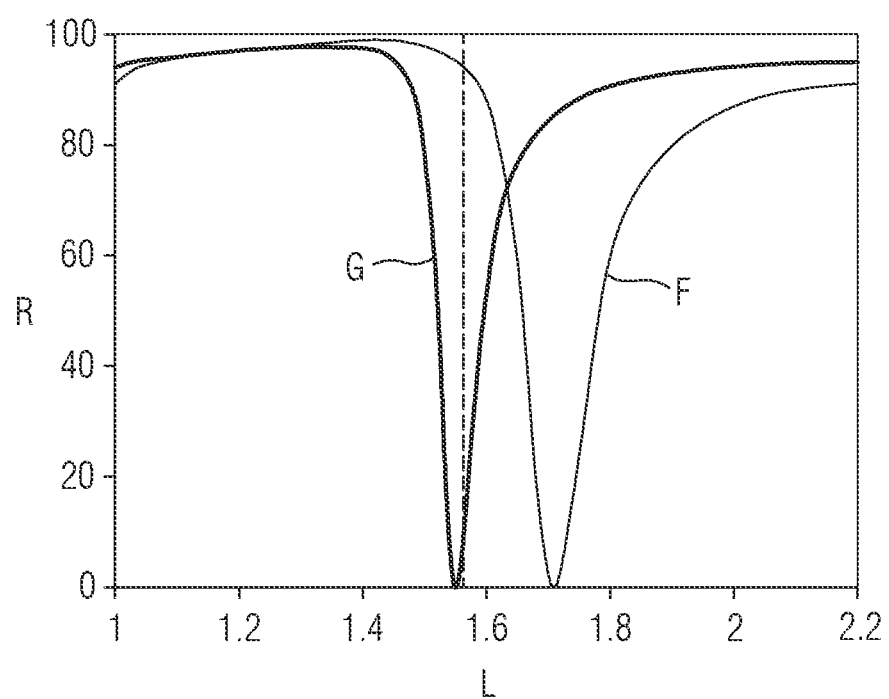

It shows:

FIGS. 1, 2 and 5 exemplary embodiments of the projection apparatus,

FIGS. 3A, 3B and 6 exemplary embodiments of an optical element, FIG. 7 an exemplary embodiment of a reflective element and FIGS. 4 and 8 exemplary embodiments of a final spectral distribution.

The exemplary embodiment of the projection apparatus 1 according to FIG. 1 comprises a light source 2, an optical element 3 and a projection surface 4. The optical element 3 is arranged in a beam path 5 between the light source 2 and the projection surface 4. In particular, the beam path 5 corresponds to an optical axis of the projection apparatus 1.

An imaging device 9 is arranged between the optical element 3 and the projection surface 4. The optical element 3 comprises a plurality of pixels 6, which can be operated and driven independently of one another. The pixels 6 are each designed as a transmission element 7. The imaging device 9 assigns each pixel 6 to an area on the projection surface 4. During intended operation, an image is generated by the optical element 3, which is imaged onto the projection surface 4. In particular, the imaging device 9 magnifies the image formed by the optical element 3 so that it is optically perceptible to a human observer on the projection surface 4.

During intended operation, for example, the light source 2 emits light with an initial spectral distribution. In particular, the light from the light source 2 illuminates all pixels 6 of the optical element 3. By each pixel 6 of the optical element 3, the initial spectral distribution is converted into a final spectral distribution. For example, a first pixel converts light with the initial spectral distribution into light with a first final spectral distribution, which is subsequently imaged into a first region of the projection surface 4 by means of the imaging device 9. Thus, the light with the initial distribution is converted on a pixel-by-pixel basis to form an optically perceptible image on the projection surface 4.

FIG. 2 shows a projection apparatus 1 according to a second exemplary embodiment. The projection apparatus 1 of FIG. 2 shows essentially the same features as the projection apparatus 1 of FIG. 1 with the difference that the pixels 6 of the optical element 3 are designed as reflective elements 8. That is, light emitted by the light source 2 is reflected at a surface of each reflective element 8 and then imaged onto the projection surface 4 by means of the imaging device 9. The reflective elements 8 are designed such that an initial spectral distribution is transformed into a final spectral distribution upon reflection.

FIG. 3A shows a detailed view of an optical element 3 according to a further exemplary embodiment. The pixels 6 of the optical element 3 are designed as transmission elements 7. The transmission elements 7 are each arranged on a carrier 14. The carrier 14 is made of glass, for example, and is transparent for the light transmitted through the transmission elements 7. The transmission elements 7 comprise an electrically insulating layer 12 between two metallic layers 13. The metallic layer 13 facing the carrier 14 comprises a first electrical contact 10. The metallic layer 13 facing away from the carrier 14 comprises a second electrical contact 11. Light absorbing elements 15 are arranged on a surface of the carrier 14 facing away from the transmission elements 7. The light absorbing elements 15 are arranged such that they cover gaps between the transmission elements 7 in plan view of the surface of the carrier 14 facing away from the transmission elements 7.

An electrical voltage can be applied to the transmission element 7 via the electrical contacts 10, 11. The transmission element 7 forms a resonator, in particular a Fabry-Perot resonator, with a resonance condition. Light having a wavelength satisfying the resonance condition is absorbed by the transmission element 7. The operation of the transmission element 7 is described, for example, in "M. Aalizadeh et al. Toward Electrically Tunable, Lithography-Free, Ultra-Thin Color Filters Covering the Whole Visible Spectrum. Sci. Rep. 8:11316 (2018)", the disclosure content of which is hereby incorporated by reference.

Preferably, an electrical voltage can be selected and applied such that any wavelength of the visible wavelength range is absorbed in the transmission element 7. Further preferably, light in the IR range is also absorbed at a suitably selected electrical voltage. With an optical element according to FIG. 3A, the final spectral distribution of each pixel 6 can be precisely specified.

FIG. 3B shows an optical element 3 according to a further exemplary embodiment. In contrast to the optical element 3 of FIG. 3A, all transmission elements 7 of the optical element 3 according to FIG. 3B have a common first contact 10. In particular, in this case the carrier 14 is formed by one of the metallic layers 13.

FIG. 4 shows a transmission T in percent as a function of a wavelength L in nm of a transmission element 7 at several applied electrical voltages. FIG. 4 is taken from the publication "M. Aalizadeh et al. Toward Electrically Tunable, Lithography-Free, Ultra-Thin Color Filters Covering the Whole Visible Spectrum." in particular to illustrate the mode of action of a transmission element. Sci. Rep. 8:11316 (2018)." Here, curves A, B, C, D, E each refer to an electrical voltage applied to the transmission element 7. For curve A, an electrical voltage of +12 V was applied to the transmission element 7. The transmission has a global maximum at about 700 nm. Accordingly, light in the red wavelength range is transmitted by the transmission element 7. According to curve B, the global maximum of transmission T changes when an electrical voltage of +6 V is applied. In this case, the maximum is at about 610 nm. Thus, mainly light in the yellow wavelength range is transmitted by the transmission element 7. If the applied electrical voltage is reduced further, the maximum of the transmission shifts to about 550 nm (curve C) and further to about 490 nm (curve D) down to about 430 nm (curve E).

FIG. 5 shows a projection apparatus 1 according to a further exemplary embodiment. Deviating from the projection apparatus according to FIG. 1, the light source 2 in the present case has three light emitting semiconductor chips 16, 17, 18 and a light integrator 19. The light integrator 19 may comprise one or more lenses. Additionally or alternatively, the light integrator 19 may comprise one or more mirrors. In the present embodiment, the optical element 3 is as shown in FIG. 3B.

For example, the light emitting semiconductor chips 16, 17, 18 of the light source 2 are arranged to emit light of different wavelength ranges. For example, the semiconductor chip 16 is a red light emitting semiconductor chip 16, the semiconductor chip 17 is a green light emitting semiconductor chip 17, and the semiconductor chip 18 is a blue light emitting semiconductor chip 18. Here, a "red light emitting semiconductor chip" means that the light emitting semiconductor chip 16 emits light in the red wavelength range. Here, a "green light emitting semiconductor chip" means that the light emitting semiconductor chip 17 emits light in the green wavelength range. Here, a "blue light emitting semiconductor chip" means that the light emitting semiconductor chip 18 emits light in the blue wavelength range.

The light from the red, green, and blue radiation emitting semiconductor chips 16, 17, 18 is combined into mixed light by the light integrator 19, which is perceived as white light by a human observer, for example.

For example, to generate a colored image on the projection surface 4, a red sub-image is displayed followed by a green sub-image and a blue sub-image. The time interval between the individual sub-images is so small that, due to the inertia of a human eye, a human observer perceives a colored image, with the colors of each pixel of the image resulting from the mixture of the red, green and blue sub-images. For example, in generating the red sub-image, an electrical voltage is applied to each pixel 6 of the optical element 3 that is to have a red component, so that light of the red wavelength range is transmitted through that pixel. A different electrical voltage is applied to pixels 6 of the optical element 3 that are not supposed to show a red component, due to which substantially no light of the red wavelength range is transmitted through those pixels 6. In particular, the green sub-image and the blue sub-image are generated in the same way.

Deviating from the exemplary embodiment of FIG. 5, it is also possible that no light integrator 19 is used. In this case, only the red radiation emitting semiconductor chip 16 is activated and the other two semiconductor chips 17, 18 are deactivated in order to generate the red sub-image, for example.

Furthermore, it is possible that the light source 2 is a white light source with a continuous initial spectral distribution. In this case, the transmission T of each pixel 6 of the optical element 3 is selected, for example, in such a way that the associated pixel 6 is displayed on the projection surface 4 with the color to be displayed. Advantageously, a colored image can thus be displayed on the projection surface 4 without having to compose it of three sub-images.

FIG. 6 shows an optical element 3 according to a further exemplary embodiment. The optical element 3 comprises a separator 20 with which light of an initial spectral distribution can be separated into a red, green and blue wavelength range. Further, the optical element 3 comprises three sub-elements 21, 22, 23. The separator 20 splits incident light and directs light of a red wavelength range onto the first subelement 21, light of a green wavelength range onto the second subelement 22, and light of a blue wavelength range onto the third subelement 23. Each of the subelements 21, 22, 23 comprises a plurality of sub-pixels, each of which is implemented as a reflective element 8. One subpixel of each of the first, second, and third subelements 21, 22, 23 together form a pixel 6 of the optical element 3. For example, each of the subelements 21, 22, 23 generates a red sub-image, a green sub-image, and a blue sub-image, respectively.

The reflective element 8 of FIG. 7 comprises a first metallic layer 25 and a second metallic layer 26. A semiconductor material 24 and an electrically insulating material 12 are arranged between the first metallic layer 25 and the second metallic layer 26. The electrically insulating material 12 and the semiconductor material 24 are each formed in one piece. The first metallic layer 25 is thereby exclusively in contact with the semiconductor material 24 and the second metallic layer 26 is exclusively in contact with the electrically insulating material 12. A first electrical contact 10 is arranged on the first metallic layer 25 and a second electrical contact 11 is arranged on the second metallic layer 26. An electrical voltage can be applied to the reflective element 8 via the first electrical contact 10 and the second electrical contact 11.

The reflective element 8 forms a resonator, in particular a Fabry-Perot resonator, with a resonance condition. Light with a wavelength that satisfies the resonance condition is absorbed by the reflective element 8. The mode of action of the reflective element 8 is described, for example, in the publication "S. S. Mirshafieyan et al. Electrically tunable perfect light absorbers as color filters and modulators. Sci. Rep. 8:2635 (2018)", the disclosure content of which is hereby incorporated by reference.

FIG. 8 shows a reflectivity R in percent as a function of a wavelength L in μm of a reflective element 8 at two different applied electrical voltages. In particular, to illustrate the mode of action of a reflective element 8, FIG. 8 is taken from the publication "S. S. Mirshafieyan et al. Electrically tunable perfect light absorbers as color filters and modulators. Sci. Rep. 8:2635 (2018)." For curve F, an electric voltage of 0 V was applied to the reflective element. At a wavelength L of about 1.7 μm, the reflectivity R exhibits a minimum and drops to 0. At curve G, an electrical voltage of −50 V was applied. The minimum of the reflectivity R thus shifts to a wavelength L of about 1.55 μm.

The invention is not restricted to the exemplary embodiments by the description based on said exemplary embodiments. Rather, the invention encompasses any new feature as well as any combination of features, which in particular comprises any combination of features in the patent claims, even if this feature or this combination itself is not explicitly specified in the patent claims or exemplary embodiments.

List of Reference Signs

1 Projection apparatus
2 Light source
3 Optical element
4 Projection surface
5 Beam path
6 Pixel of the optical element
7 Transmission element
8 Reflective element
9 Imaging device
10 First electrical contact
11 Second electrical contact
12 Electrically insulating material
13 Metallic layer
14 Carrier
15 Light absorbing element
16 Red light emitting semiconductor chip
17 Green light emitting semiconductor chip
18 Blue light emitting semiconductor chip
19 Light integrator
20 Separator
21 First subelement
22 Second subelement
23 Third subelement
24 Semiconductor material
25 First metallic layer
26 Second metallic layer
L Wavelength
R Reflectivity
T Transmission

The invention claimed is:

1. A projection apparatus comprising:
a light source for emitting light with an initial spectral distribution,
an optical element, and
a projection surface,
wherein
the optical element is arranged in a beam path of the light emitted from the light source between the light source and the projection surface,
the optical element comprises a number of pixels,
the pixels of the optical element are each configured to convert light with the initial spectral distribution into light with a predetermined final spectral distribution different from the initial spectral distribution,
each pixel comprises a transmission element or a reflective element that forms a resonator with a resonance condition that can be changed by applying an electric voltage, and
the optical element comprises no mechanically movable parts.

2. The projection apparatus according to claim 1, wherein
the pixels of the optical element each comprise a transmission element,
the transmission element comprises two electrical contacts for applying an electrical voltage,
the transmission element comprises an electrically insulating material between two metallic layers,
one metallic layer each is electrically conductively connected to an electrical contact of each pixel, and
the electrically insulating material has a refractive index that changes according to a function of the applied voltage.

3. The projection apparatus according to claim 1, wherein
the pixels of the optical element each comprise at least one reflective element,
the reflective element comprises two electrical contacts for applying an electrical voltage,
the reflective element comprises an electrically insulating material and a semiconductor material between two metallic layers,
one metallic layer each is electrically conductively connected to an electrical contact of each pixel, and
the semiconductor material has a charge carrier density that changes according to a function of the applied voltage.

4. The projection apparatus according to claim 3, wherein
the optical element comprises a first, a second and a third subelement, wherein
each of the subelements comprises a number of subpixels,
one subpixel of each of the first, second and third subelements together form one pixel of the optical element, and
each subpixel comprises a reflective element.

5. The projection apparatus according to claim 3,
wherein the number of subpixels of each subelement corresponds to the number of pixels of the optical element.

6. The projection apparatus according to claim 4, wherein
the initial spectral distribution comprises wavelengths of a blue, green and/or red wavelength range,
the optical element comprises an optical separator configured to,
splitting the light of the initial spectral distribution into light of the blue wavelength range, the green wavelength range and the red wavelength range, and directing light of the blue wavelength range onto the first subelement, directing light of the green wavelength range onto the second subelement, and directing light of the red wavelength range onto the third subelement.

7. The projection apparatus according to claim 1, wherein an imaging device is arranged between the optical element and the projection surface, wherein the imaging device assigns an area of the projection surface to each pixel of the optical element.

8. The projection apparatus according to claim 1, wherein the light source comprises at least three light emitting semiconductor chips, wherein at least one of the light emitting semiconductor chips emits light of a red wavelength range, at least one of the light emitting semiconductor chips emits light of a green wavelength range, and at least one of the light emitting semiconductor chips emits light of a blue wavelength range.

9. The projection apparatus according to claim 1, wherein the light source is a white light source configured to emit light with a continuous initial spectral distribution in the visible wavelength range.

10. A projection apparatus comprising:

a light source for emitting light with an initial spectral distribution, an optical element, and a projection surface, wherein the optical element is arranged in a beam path of the light emitted from the light source between the light source and the projection surface, the optical element comprises a number of pixels, the pixels of the optical element are each configured to convert light with the initial spectral distribution into light with a predetermined final spectral distribution different from the initial spectral distribution, the pixels of the optical element each comprise a transmission element, the transmission element comprises two electrical contacts for applying an electrical voltage, the transmission element comprises an electrically insulating material between two metallic layers, one metallic layer each is electrically conductively connected to an electrical contact of each pixel, and the electrically insulating material has a refractive index that changes according to a function of the applied voltage.

11. A projection apparatus comprising:

a light source for emitting light with an initial spectral distribution, an optical element, and a projection surface, wherein the optical element is arranged in a beam path of the light emitted from the light source between the light source and the projection surface, the optical element comprises a number of pixels, the pixels of the optical element are each configured to convert light with the initial spectral distribution into light with a predetermined final spectral distribution different from the initial spectral distribution, the pixels of the optical element each comprise at least one reflective element, the reflective element comprises two electrical contacts for applying an electrical voltage, the reflective element comprises an electrically insulating material and a semiconductor material between two metallic layers, one metallic layer each is electrically conductively connected to an electrical contact of each pixel, and the semiconductor material has a charge carrier density that changes according to a function of the applied voltage.

* * * * *